United States Patent [19]

Bell

[11] Patent Number: 5,108,156
[45] Date of Patent: Apr. 28, 1992

[54] ROTOR & HUB RUN-OUT SHIM FOR AUTOMOTIVE WHEEL ASSEMBLY

[76] Inventor: Chris R. Bell, 20 Hales Manor Court, Guelph, Ontario, Canada, N1G 4E2

[21] Appl. No.: 721,854

[22] Filed: Jun. 10, 1991

[51] Int. Cl.⁵ ............................................. B60B 3/14
[52] U.S. Cl. ............................ 301/6 R; 301/6 WB; 301/105 R; 188/73.1; 188/382; 411/531
[58] Field of Search ............... 301/6 R, 6 S, 6 E, 6 W, 301/6 CS, 8, 9 DN, 105 R, 111, 6 WB; 188/71.5, 73.1, 218 A, 218 XL, 382; 411/84, 87, 100, 531, 537, 538, 544, 546

[56] References Cited

U.S. PATENT DOCUMENTS

| | | | |
|---|---|---|---|
| 1,230,616 | 6/1917 | Stevenson | 301/9 TV |
| 3,603,198 | 9/1971 | Seefeld | 411/531 |
| 3,630,323 | 12/1971 | Hickle | 301/6 E X |
| 4,564,242 | 1/1986 | Krude et al. | 301/6 CS X |
| 4,690,365 | 9/1987 | Miller et al. | 411/537 X |

FOREIGN PATENT DOCUMENTS

| | | | |
|---|---|---|---|
| 270493 | 1/1930 | Italy | 301/9 TV |
| 2167717 | 6/1986 | United Kingdom | 301/9 TV |

*Primary Examiner*—Russell D. Stormer
*Attorney, Agent, or Firm*—Rogers & Scott

[57] ABSTRACT

A shim for fitting a rotor of an automotive wheel assembly to an associated hub comprising an annular body connecting a plurality of washers, the body being thinner than at least some of the washers so that surface imperfections on the mating surfaces of the hub and rotor may be accomodated between the washers and the surface area of contact between the hub and rotor is limited to the washers.

3 Claims, 3 Drawing Sheets

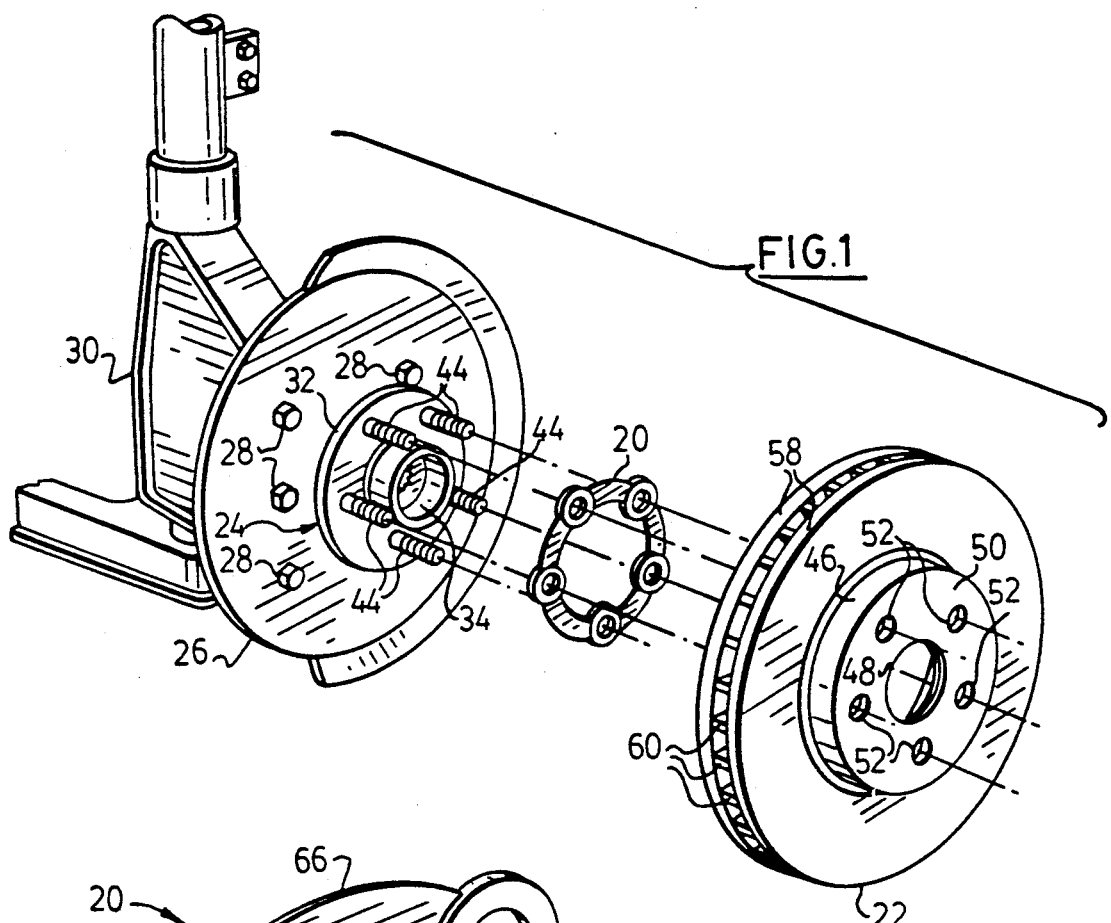
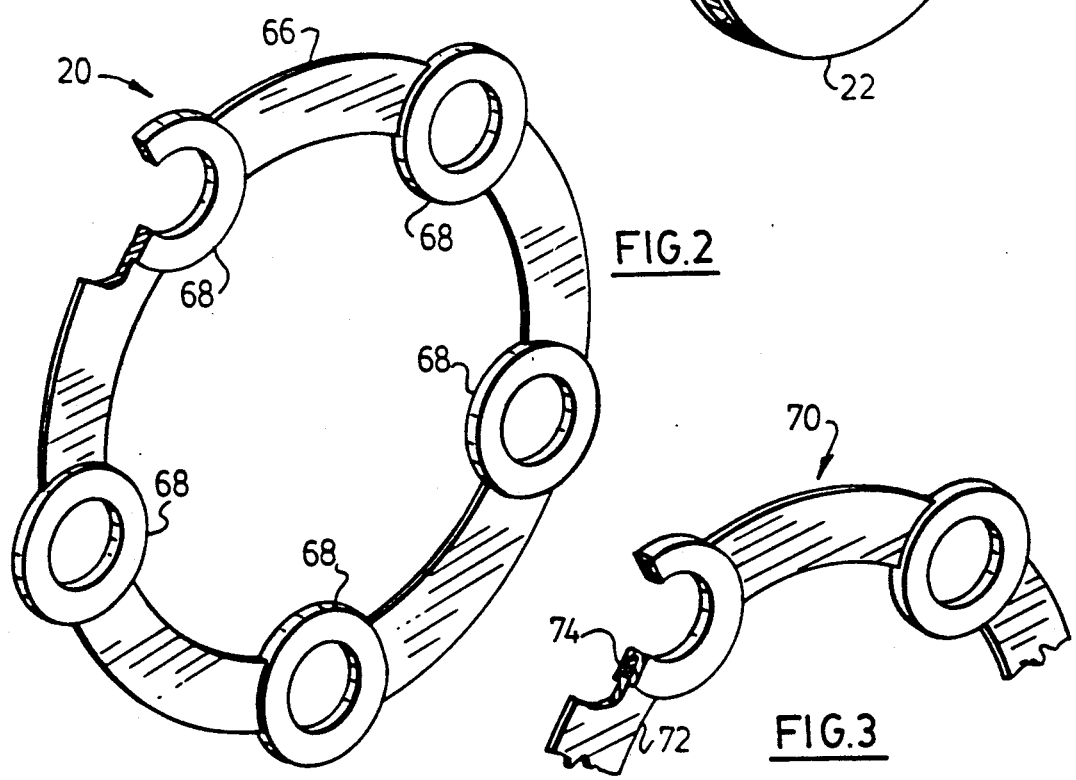
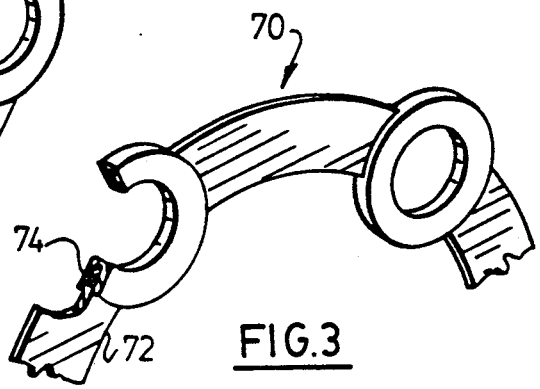

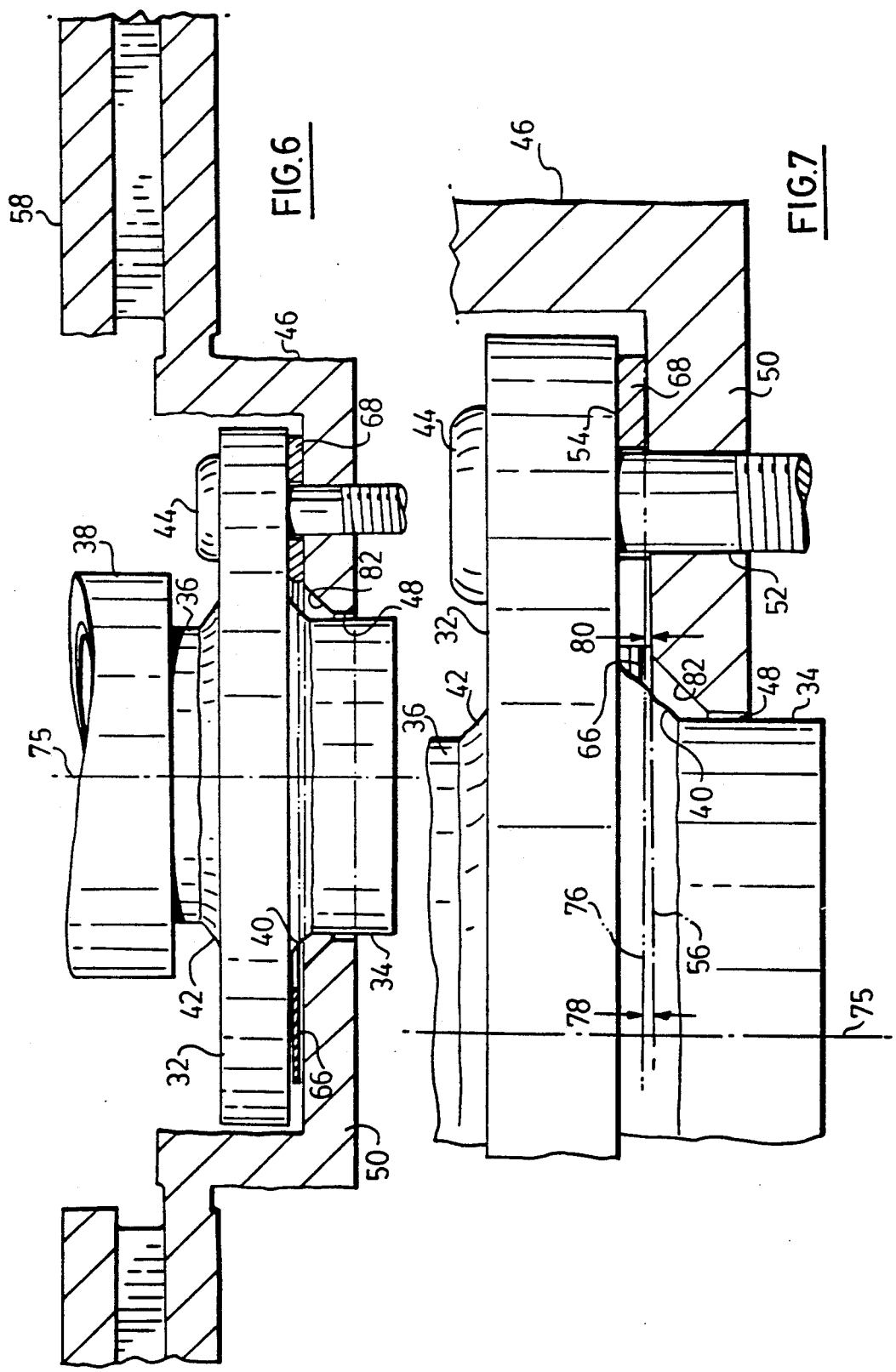

ROTOR AND HUB RUN-OUT SHIM FOR AUTOMOTIVE WHEEL ASSEMBLY

BACKGROUND OF THE INVENTION

This invention relates to automotive wheel assemblies, in particular to imperfections on the hub and rotor mating surfaces which may operate to cause lateral run-out of a rotor. This problem may manifest itself as an annoying vibration of the steering wheel and brake pedal.

Sometimes these symptoms are attributable to uneven wear of the rotor by the brake calipers in front-wheel drive vehicles or warping from heat. This problem is addressed by refinishing the rotor on a stationary lathe or by grinding the rotor on the car with a portable lathe. While the process of refinishing will produce smooth parallel surfaces on the rotor, the symptoms will reappear and may even be aggravated if the mating surfaces of the hub and the rotor are not carefully cleaned or if these surfaces are imperfect in some way which causes the rotor to wobble on the hub.

An object of this invention is to provide means to alleviate the abovementioned problems at least to some extent.

SUMMARY OF THE INVENTION

In accordance with this invention, there is provided a shim comprising an annular body connecting a plurality of washers which are adapted to locate about the fasteners which extend outwardly from a hub in an automotive wheel assembly. The body is thinner than at least some of the washers so that surface imperfections, including dirt and rust particles between the hub and the rotor will be accomodated in a space defined by the washers when the shim is positioned between the hub and the rotor.

The washers operate to space the mating surfaces of the rotor and to minimize the surface area of contact between the hub and the rotor.

BRIEF DESCRIPTION OF THE DRAWINGS

A preferred embodiment of the invention will now be described with reference to the accompanying drawings, in which:

FIG. 1 is a perspective exploded view showing the location of a shim according to the invention relative to a hub and rotor in a wheel assembly;

FIG. 2 (drawn to a larger scale) is a perspective view of the shim of FIG. 1;

FIG. 3 is a similar view to FIG. 2 showing an alternative embodiment of the shim according to the invention;

FIG. 6 is a side view of the hub positioned in a bearing sleeve at one end, and attached at the other end to the rotor shown in cross section; and FIG. 7 shows a portion of FIG. 6 drawn to a larger scale to show minimization of run-out with the shim according to the invention.

DESCRIPTION OF PREFERRED EMBODIMENT WITH REFERENCE TO DRAWINGS

Figure 4:
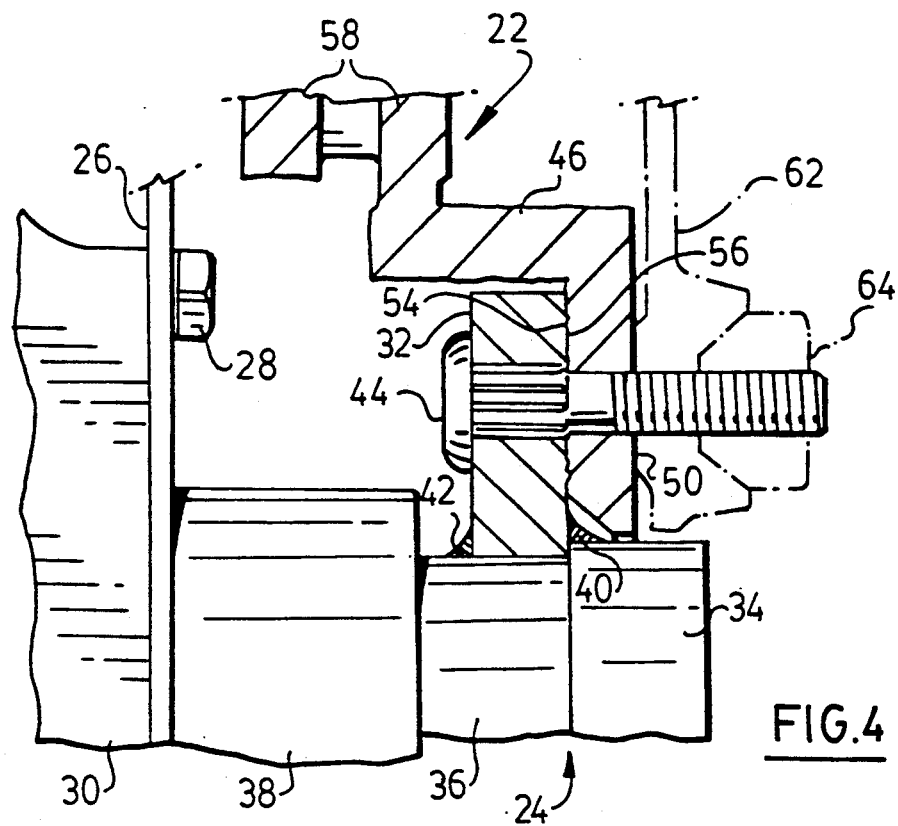
FIG. 4 is a part sectional view through a portion of a wheel assembly showing surface imperfections on the mating surfaces of a hub and rotor.

A shim according to the invention is generally indicated by numeral 20 in FIG. 1 where it is shown in its operative position between a rotor 22 and a hub 24 comprising an automotive wheel assembly. A shield 26 apertured to surround the hub 24 is fastened with bolts 28 to a wheel strut assembly 30.

As may be seen more clearly from FIGS. 4 to 7, the hub 24 comprises an annular flange 32 welded on one side to a collar 34 and on the other side to a sleeve 36 received in a bearing housing 38. It will be understood that the hub 24, in use, will rotate relative to the housing 38. The outer weld adjacent the collar 34 is identified by numeral 40 and the inner weld adjacent the sleeve is identified by numeral 42.

A plurality of studs 44 are fastened to the hub flange 32 in a predetermined pattern and on the same pitch circle diameter surrounding the collar 34. The studs 44 are oriented with the threaded ends extending outwardly so as to connect the rotor 22 and associated wheel 62 to the hub 24 in a fashion which is more clearly described below.

The rotor 22 comprises a cup 46 with a central aperture 48 adapted to receive therethrough a wheel shaft (not shown) fixed to the hub collar 34 and extending outwardly from the strut assembly 30. The cup 46 is dimensioned to receive the hub flange 32 and includes at its outer end an annular flange 50 having a plurality of apertures 52 lying in the same pitch circle diameter relative to the wheel shaft as the studs 44 and having a similar pattern so as to accomodate the studs therethrough.

A pair of parallel, annular discs 58 spaced from each other by a plurality of rectangular fillets 60 extend outwardly from the cup 46 and define braking surfaces for a brake caliper (not shown).

The completion of the assembly to a wheel 62 (shown in chain dotted outline in FIGS. 4 and 5) is done by positioning the wheel over the studs and threading nuts 64 over the studs so as to secure the wheel between the nut and the rotor 22.

Figure 5:
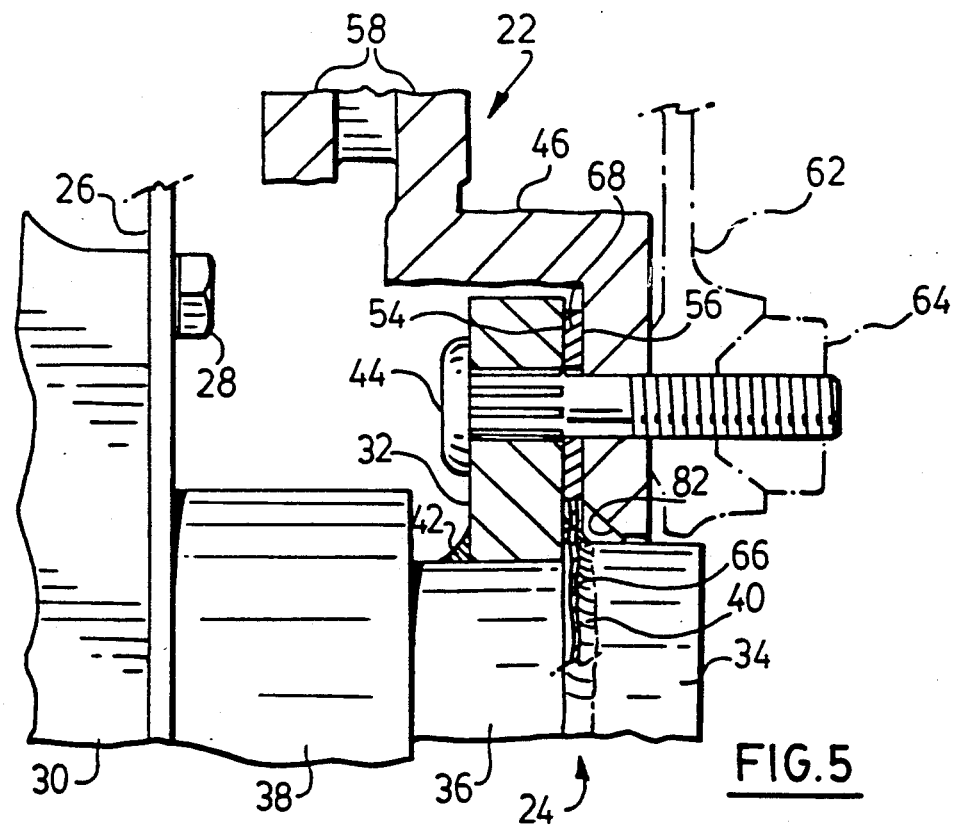
FIG. 5 is a similar view to FIG. 4 with a shim according to the invention interposed between the rotor and hub of FIG. 4.

This invention addresses the problems which occur between the mating surfaces of the hub flange 32 and of the rotor flange 50 and respectively designated by numerals 54, 56 in FIGS. 4 and 5.

The structure of the shim 20 will now be described with reference to FIG. 2. The shim 20 comprises an annular body 66 which connects a plurality of washers 68 spaced from each other to correspond to the pattern of the studs 44. The shim 20 is preferably die cut from sheet metal and machined between the washers 68 on one side thereof so that the connecting annular body 66 is approximately half the thickness of the associated washers 68, typically to a thickness of about 0.015 in.

In an alternative embodiment of the shim generally indicated by numeral 70 in FIG. 3, the annular body 72 is moulded from synthetic plastic material in a process which simultaneously coats the associated metal washers 74 with the synthetic material thereby connecting the washers as a single unit. In the shim 70, the body 72 is positioned midway between the height of the associated washers 74.

It will be appreciated that the construction of the shim according to the invention allows a plurality of washers to be positioned over the studs 44 in a single action. In use, the shim 20 is positioned between the mating surfaces 54, 56 of the hub and rotor as most clearly shown in FIG. 5. The washers 68 operate to space the mating surfaces 54, 56 such that any intervening dirt, rust or surface imperfections on the mating surfaces and outside the immediate area surrounding the studs 44 will be accomodated without adversely affecting the relative position of the rotor 22 on the hub 24. While this cannot readily be appreciated from FIG. 4 of the drawings, it is understood that such surface imperfections between the mating surfaces 54, 56 will result in some lateral runout which may be more or less significant.

Ideally, the mating surfaces 54, 56 would be machined to be perfectly flat by original equipment manufacturers (OEM) so as to match and operate as an intrinsic unit. Inevitably, however, surface imperfections do occur and localized high spots on these surfaces are not uncommon. A further problem manifests itself during turning of the mating surface 56 of the rotor 22. As most clearly shown in FIG. 7, the mating surface 56 is slightly conical or dished such that the surface adjacent the central aperture 48 meets the centre line 75 at an obtuse angle and is therefore lower than an ideal surface 76 orthogonal to the centre line. The distance 78 separating the mating surface 56 from the ideal surface 76 adjacent the central aperture 48 is significantly greater than the distance 80 separating these surfaces at the stud apertures 52. Typically, the separation 78 will be 0.001-0.005 inches or more. Therefore, if there are any high spots or imperfections, or surface dirt, including rust particles, between the mating surfaces 54, 56 such minor runouts can grow in a short time to as much as 0.015 or 0.020 inch or more as a result of uneven stress for example resulting from over torquing of wheel nuts thereby becoming a serious and annoying problem.

The use of the shim 20 according to the invention limits the magnitude of surface to surface contact between the mating surfaces 54, 56 to the exposed annular surface of the washers 68. It will be understood that the relative separation of the rotor mating surface 56 from the ideal surface 76 orthogonal to the centre line 75 in the immediate area of the stud apertures 52 on a radius extending through the washers 68 will be a fraction of the distance 78 representative of the relative separation of said surfaces between the inner end and outer end of the rotor flange 50. Therefore, because the separation of the mating surface 56 from the ideal surface 76 is minimal over said radial distance through the washers 68, there is relatively little play between the hub 26 and the rotor 22 and the opportunity for runout is minimized.

A further advantage resulting from the use of the shim according to the invention is that the rotor and hub are spaced and the rotor will clear the weld bead 40 joining the rotor flange 32 to the rotor collar 34. While a cambered portion 82 is provided at the inner end of the central aperture 48 of the rotor for this purpose, it will be appreciated that where the cambered portion is cut at an angle which is exceeded by the weld bead 40, the rotor 22 will rest on the weld 40 of the hub thereby preventing the surfaces 54, 56 of the hub and rotor from mating. This problem is obviated by the shim according to the invention.

It will be understood that several variations may be made to the above described preferred embodiment of the invention without departing from the scope of the appended claims. In particular, it will be understood that the washers may be arranged in a variety of patterns to match the stud pattern on the hub. The annular configuration of the body interconnecting the washers may also be varied so as to inscribe a polygon for example instead of a circle. The relative thicknesses of annular portions and of the washers may also be varied as required as will the material of construction comprising the washers and the annular body.

I claim:

1. Shim for fitting a rotor of an automotive wheel assembly to an associated hub, said hub having a plurality of fasteners extending outwardly from a substantially planar hub surface in a pre-determined pattern and adapted to traverse a substantially planar rotor surface opposite to said planar hub surface, the shim comprising an annular body connecting a plurality of washers spaced from each other in said pre-determined pattern and thereby adapted to locate about said fasteners between the hub and the rotor, the annular body being substantially thinner than at least some of the washers so as to accomodate surface imperfections between the hub and the rotor.

2. Shim according to claim 1 in which the annular body is coplanar with one side of the washers.

3. Shim according to claim 1 in which the annular body lies intermediate the sides of the washer.

* * * * *